US007665554B1

(12) United States Patent  
Walsh

(10) Patent No.: US 7,665,554 B1  
(45) Date of Patent: Feb. 23, 2010

(54) RECHARGING SYSTEM FOR ELECTRICALLY POWERED VEHICLE, AND VEHICLE INCORPORATING SAME

(76) Inventor: Richard T. Walsh, 43 Knob Hill Rd., Glastonbury, CT (US) 06033

( * ) Notice: Subject to any disclaimer, the term of this patent is extended or adjusted under 35 U.S.C. 154(b) by 0 days.

(21) Appl. No.: 12/386,593

(22) Filed: Apr. 21, 2009

(51) Int. Cl.  
*B60K 16/00* (2006.01)

(52) U.S. Cl. ............ 180/2.2; 180/165; 180/65.31
(58) Field of Classification Search ............ 180/165, 180/2.1–2.2, 65.31, 68.1–68.2, 903  
See application file for complete search history.

(56) References Cited

U.S. PATENT DOCUMENTS

| | | | | |
|---|---|---|---|---|
| 1,198,501 | A * | 9/1916 | Wintermute | 180/7.4 |
| 2,148,804 | A | 2/1939 | Clayton | |
| 3,444,946 | A * | 5/1969 | Waterbury | 180/2.2 |
| 3,556,239 | A * | 1/1971 | Spahn | 180/65.25 |
| 3,621,930 | A * | 11/1971 | Dutchak | 180/65.31 |
| 3,876,925 | A * | 4/1975 | Stoeckert | 322/1 |
| 3,878,913 | A * | 4/1975 | Lionts et al. | 180/2.2 |
| 3,943,726 | A * | 3/1976 | Miller | 62/235.1 |
| 4,075,545 | A * | 2/1978 | Haberer | 322/35 |
| 4,132,282 | A * | 1/1979 | Sparks | 180/2.2 |
| 4,135,593 | A * | 1/1979 | Fowkes | 180/65.1 |
| 4,141,425 | A * | 2/1979 | Treat | 180/2.2 |
| 4,179,007 | A * | 12/1979 | Howe | 180/2.2 |
| 4,254,843 | A * | 3/1981 | Han et al. | 180/165 |
| 4,314,160 | A | 2/1982 | Boodman et al. | |
| 4,327,808 | A * | 5/1982 | Howard | 180/7.4 |
| 4,423,368 | A * | 12/1983 | Bussiere | 322/35 |
| 4,934,449 | A * | 6/1990 | Watt et al. | 165/41 |
| 4,938,303 | A * | 7/1990 | Schaal et al. | 180/68.1 |
| 5,141,173 | A * | 8/1992 | Lay | 244/2 |
| 5,280,827 | A * | 1/1994 | Taylor et al. | 180/165 |
| 5,386,146 | A * | 1/1995 | Hickey | 290/55 |
| 5,490,572 | A * | 2/1996 | Tajiri et al. | 180/65.1 |
| 5,563,451 | A | 10/1996 | Furukawa | |
| 5,680,032 | A * | 10/1997 | Pena | 290/52 |
| 5,746,283 | A * | 5/1998 | Brighton | 180/65.31 |
| 5,760,515 | A * | 6/1998 | Burns | 310/115 |
| 5,844,324 | A * | 12/1998 | Spriggle | 290/55 |
| 5,920,127 | A * | 7/1999 | Damron et al. | 290/44 |
| 6,138,781 | A * | 10/2000 | Hakala | 180/2.2 |
| 6,385,968 | B1 * | 5/2002 | Gustafsson et al. | 60/320 |
| 6,692,066 | B2 * | 2/2004 | Fairburn et al. | 296/208 |
| 6,700,215 | B2 * | 3/2004 | Wu | 290/44 |
| 6,838,782 | B2 * | 1/2005 | Vu | 290/55 |
| 6,857,492 | B1 * | 2/2005 | Liskey et al. | 180/165 |
| 6,882,059 | B1 * | 4/2005 | DePaoli | 290/44 |
| 6,897,575 | B1 * | 5/2005 | Yu | 290/44 |

(Continued)

*Primary Examiner*—S. Joseph Morano  
*Assistant Examiner*—Jacob Meyer  
(74) *Attorney, Agent, or Firm*—Ira S. Dorman

(57) ABSTRACT

An electrically powered motor vehicle includes a system for recharging the on-board batteries, which system includes an air-flow conduit with an entrance at the front of the vehicle, a plurality of electric turbines mounted in tandem within a first portion of the conduit, and an additional electric turbine mounted within a second portion of the conduit, which exits at the underside of the vehicle. The tandem-mounted turbines are disposed for effective rotation, in reaction to air flow, on a generally horizontal axis, and the additional electric turbine is mounted for rotation in reaction to air flow on a second axis, generally transverse to the first axis and disposed proximate the exit end of the conduit.

16 Claims, 1 Drawing Sheet

U.S. PATENT DOCUMENTS

| | | | |
|---|---|---|---|
| 7,290,630 B2 * | 11/2007 | Maeda et al. | 180/68.4 |
| 7,347,294 B2 * | 3/2008 | Gonzalez | 180/65.1 |
| 7,398,841 B2 * | 7/2008 | Kaufman | 180/2.2 |
| 7,434,636 B2 * | 10/2008 | Sutherland | 180/2.2 |
| 7,497,287 B2 * | 3/2009 | Kunikata et al. | 180/68.1 |
| 2002/0066608 A1 * | 6/2002 | Guenard et al. | 180/65.3 |
| 2002/0153178 A1 * | 10/2002 | Limonius | 180/2.2 |
| 2003/0029581 A1 * | 2/2003 | Vide | 160/201 |
| 2003/0155464 A1 * | 8/2003 | Tseng | 244/58 |
| 2003/0209370 A1 * | 11/2003 | Maberry | 180/2.2 |
| 2004/0084908 A1 * | 5/2004 | Vu | 290/55 |
| 2005/0023057 A1 * | 2/2005 | Maeda et al. | 180/68.1 |
| 2005/0029027 A1 * | 2/2005 | Kunikata et al. | 180/68.1 |
| 2005/0098361 A1 * | 5/2005 | Mitchell | 180/2.2 |
| 2005/0121242 A1 * | 6/2005 | Robinson | 180/165 |
| 2006/0113118 A1 * | 6/2006 | Kim | 180/2.2 |
| 2006/0213697 A1 * | 9/2006 | Sutherland | 180/2.2 |
| 2006/0278445 A1 * | 12/2006 | Chang | 180/2.2 |
| 2007/0089918 A1 * | 4/2007 | Gonzalez | 180/65.1 |
| 2007/0284155 A1 * | 12/2007 | Cong | 180/2.2 |
| 2008/0169133 A1 * | 7/2008 | Tomoyasu | 180/2.2 |
| 2009/0133943 A1 * | 5/2009 | Noguchi et al. | 180/65.21 |

* cited by examiner

RECHARGING SYSTEM FOR ELECTRICALLY POWERED VEHICLE, AND VEHICLE INCORPORATING SAME

BACKGROUND OF THE INVENTION

A factor that is primary in the development of a practical electrically powered vehicle concerns the ability to conveniently and efficiently recharge the on-board batteries that serve as the power source. "The charging and recharging of electric vehicle batteries is a critical part of the energy cycle of an electric vehicle." (*The Electric Car*, Westbrook, M. H., The Institution of Engineering and Technology, and Society of Automotive Engineers, 2001, 2007) It has long been proposed to incorporate air-driven electric current generators of various kinds into electric vehicles for recharging their batteries, as evidenced by the following U.S. Pat. Nos. Dutchak No. 3,621,930, Stoeckert No. 3,876,925, Sparks No. 4,132, 282, Treat No. 4,141,424, Howe No. 4,179,007, Han et al. No. 4,254,843, Boodman et al. No. 4,314,160, and Damron et al. No. 5,920,127.

Despite the activity in the art indicated by the foregoing, in many instances the recharging systems heretofore provided do not function efficiently to convert air flow forces into electric energy. Moreover, the prior art systems would often diminish the performance of the vehicle, and they tend to be unsightly or, at best, to be incompatible with desirable vehicular aesthetics.

BRIEF SUMMARY OF THE INVENTION

Broad objects of the present invention are to provide a novel system for efficiently converting the thrust of moving air into electric energy for recharging on-board batteries of an electrically powered motor vehicle into which the system is integrated; to provide a novel electrically powered motor vehicle having an integral battery recharging system; and to provide a novel method for effecting recharging of the batteries of an electric vehicle.

Additional objects of the invention are to provide such a recharging system and method which can be integrated and implemented, respectively, in an electrically powered motor vehicle without substantially diminishing the performance and aesthetic character of the vehicle, and to provide an attractive and high-performing electrically powered motor vehicle having integrated therein the battery-recharging capability afforded by such a system and method.

It has now been found that certain of the foregoing and related objects of the invention are attained by the provision a system for recharging the on-board rechargeable battery means of an electrically powered motor vehicle comprising, in combination: an air-flow conduit of circular cross section constructed to be contained in a compartment defined within a front end portion of an electrically powered motor vehicle, the conduit having an entrance end, for disposition proximate the front of the vehicle, and an exit end for disposition proximate the underside of the vehicle, whereby air flow can be conducted by the conduit from the entrance end to the exit end by forward movement of the vehicle, the conduit comprising a first axial portion that extends from the entrance end, and a second portion that extends continuously from the first portion to the exit end and generally on a second axis transverse to the first axis; a plurality of air-driven electric generators mounted in tandem and contained wholly within the first portion of the conduit and having rotor structures disposed for effective rotation, substantially on the first axis, in reaction to air passing through the first portion of the conduit from the entrance end, for generating electrical current; an additional air-driven electric generator mounted and contained wholly within the second portion of the conduit, proximate the exit end, and having rotor structure disposed for effective rotation, substantially on the second axis, in reaction to air passing through the second portion of the conduit for generating electrical current; and means for operatively connecting the plurality of electric generators and the additional electric generator for delivering electric current to effect recharging of the rechargeable battery means of a motor vehicle.

In preferred embodiments of the recharging system, at least three electric generators will be mounted in tandem within the first portion of the conduit. Each of the electric generators will normally be a microturbine, desirably having a rated power output of at least about 0.2 kilowatt (and typically 0.3 to 0.5 kilowatt) at a relative air speed of about 12.5 meters per second. The conduit of the system will advantageously be of substantially uniform diameter along its entire length, preferably with a diameter of at least about 30 inches.

Other objects of the invention are attained by the provision of an electrically powered motor vehicle in which the recharging system herein described is integrated. The vehicle is comprised of a chassis, a body, an electric motor operatively connected for driving the vehicle, and on-board rechargeable battery means operatively connected for providing power to the electric motor.

Still other objects of the invention are attained by the provision of a method for effecting recharging of rechargeable battery means carried on-board an electrically powered motor vehicle, wherein the vehicle and the integral recharging system are constructed in accordance with the present description. Recharging of the battery means is effected by propelling the motor vehicle forwardly so as to cause air to flow through the conduit, from the entrance end toward the exit end thereof, and also to cause air to pass along the underside of the motor vehicle to thereby promote air flow through the conduit toward the exit end. The flowing air causes the rotor structures of the electric generators to rotate, to in turn generate electric current and thus effect recharging of the operatively connected battery means.

DETAILED DESCRIPTION OF THE INVENTION

Figure 1:
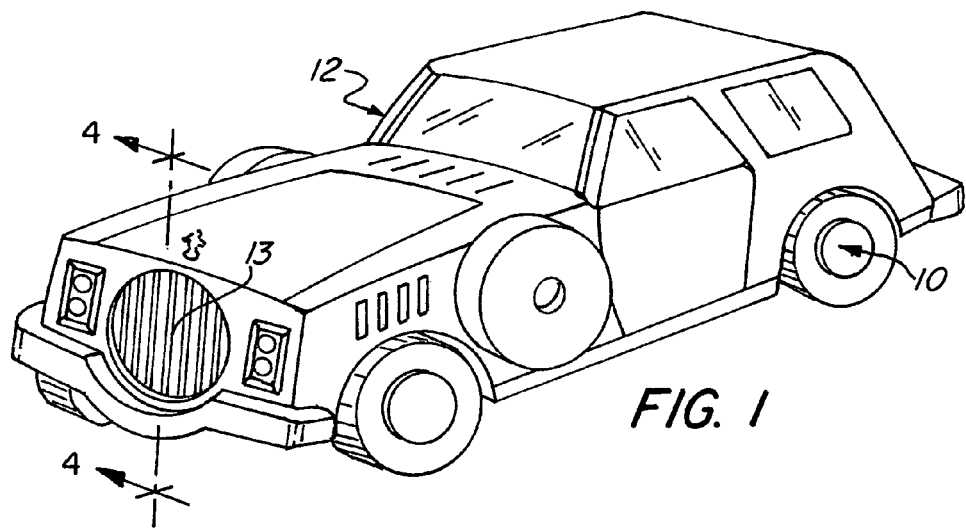
FIG. 1 is a perspective view of an electrically powered automobile embodying the present invention.

Except for modifications made to accommodate the battery recharging system of the invention, the automobile depicted in FIG. 1 may be of conventional design and construction. Thus, it is noted, that viewed from the exterior, the automobile shows little or no evidence that it includes a battery recharging system; it is entirely aesthetic, with no external structural or mechanical features or units that would detract from its appearance. The absence of such features and units also avoids the undesirable performance effects that would result from the introduction of air turbulence, wind resistance, increased drag, and the like.

Figure 3:
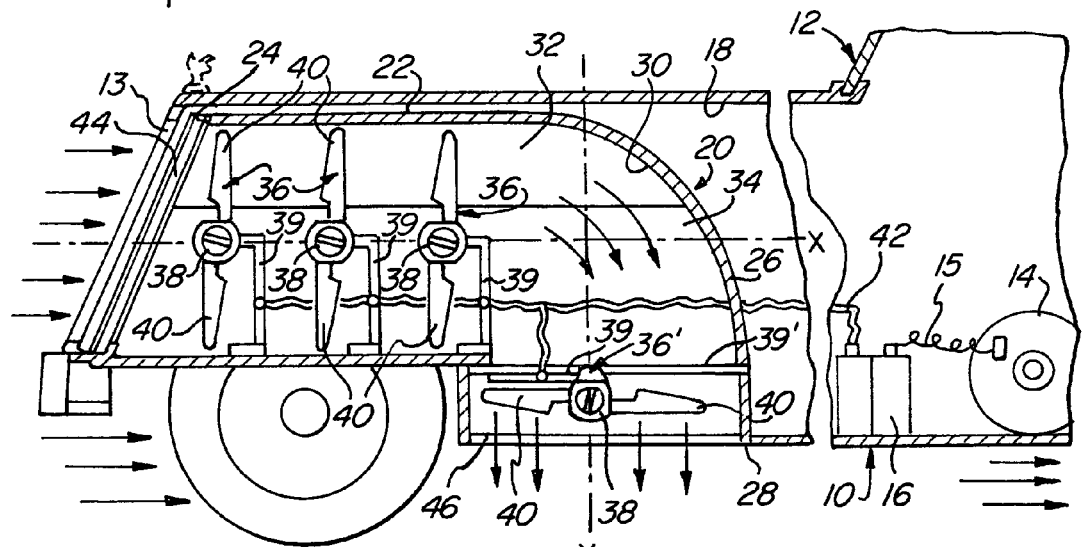
FIG. 3 is a fragmentary diagrammatic sectional view, taken along line 3-3 of FIG. 2, drawn to an enlarged scale, and showing the internal construction of the front end portion of the automobile and integral components of the electrical system.

The automobile comprises, more particularly, a chassis and a body, generally designated respectively by the numerals 10 and 12. A circular grille 13 is affixed at the front end of the body 10, and will desirably be mounted for removal or displacement so as to facilitate access to the recharging system components. As seen in FIG. 3, the automobile also includes an electric motor 14, operatively connected (by means not shown) for transmitting power to the drive train, and a bank of rechargeable batteries 16 electrically connected, by a cable section 15, to the electric motor 14 to provide the necessary energizing current. It will be appreciated that the motor 14 and bank of batteries 16 may be positioned at any suitable location on the chassis 10 or in the body 12, such as (in the case of the batteries 16) under a rear seat.

A compartment 18 is defined within the front-end portion of the vehicle body 12, utilizing space that would otherwise constitute the engine compartment of a conventional vehicle powered by an internal combustion engine. The compartment 18 contains a conduit, generally designated by the numeral 20, of circular cross section. The conduit 20 is comprised of a front portion 22, disposed on a longitudinal (normally horizontal) axis "X" and extending rearwardly from an open entrance end 24 continuously to a back portion 26, which is disposed generally on a transverse (normally vertical) axis "Y" and leads to an exit end 28 that opens on the underside of the vehicle. The conduit 20 defines an internal passage 30, which is of circular cross section and will usually be of uniform diameter along its entire length (although a taper toward the exit end 28, or indeed a reverse taper, may be found to contribute desirably to the fluid dynamics and energy recovery capabilities of the system). The conduit 20 may advantageously be formed in two parts; i.e., an upper part 32 and a lower part 34, with the upper part 32 being removable to again facilitate access to the contained components.

A series of three current-generating electric microturbines, generally designated by the numeral 36, are arranged in tandem along the length of the front portion 22 of the conduit 20, and a fourth electric microturbine, generally designated 36', is disposed proximate the exit end 28 of the back portion 26. Although the tandem turbines 36 are equidistantly spaced from one another, it may be found that different spacings afford functional advantages. Moreover, while the illustrated microturbines 36, 36' are of identical size, once again variations may be found advantageous; if, for example, the conduit were constructed to taper in the downstream direction, microturbines of progressively decreasing dimensions may be found to most effectively recover the energy of the air stream.

Figure 2:
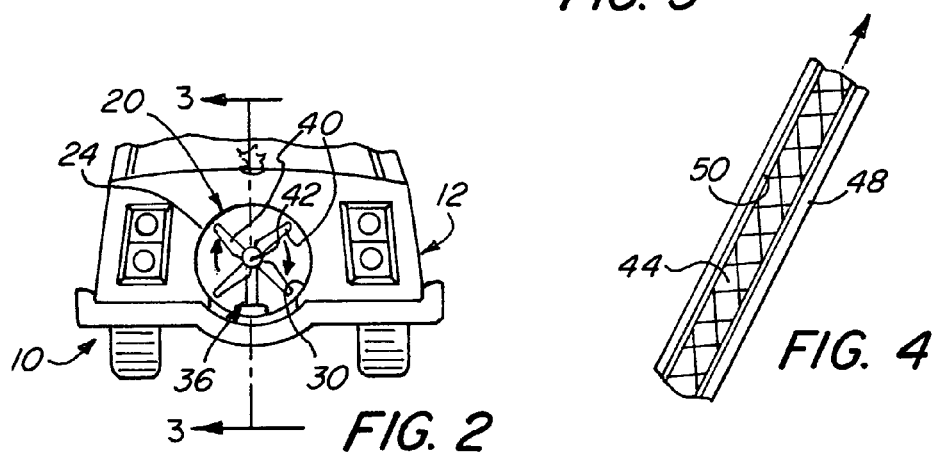
FIG. 2 is a fragmentary front view of the automobile of FIG. 1, from which the grille and an underlying guard screen have been removed.

Each microturbine 36, 36' consists of one or two mounting posts or legs 39, 39', on which is supported a hub 38 from which extends, in turn, four rotor blades 40 (see in particular FIG. 2). The blades of the tandem turbines 36 are disposed to rotate on a longitudinal (normally horizontal) axis of the conduit portion 22, and the blades of the exit turbine 36' are disposed to rotate on an axis (normally vertical) transverse thereto. It will be appreciated that the hub 38 of each turbine includes suitable structures (e.g., armatures and stators, carrying windings and magnet elements) for generating electric current during rotation, and that the wiring arrangement 42 operatively connects the turbines 36, 36' to the battery bank 16 for the delivery of recharging electric current. Needless to say, such additional electrical components as may be necessary or desirable to control and regulate current flow to the battery bank 16, and for such other purposes as may be appropriate, will be included in the recharging system, as will be evident to those skilled in the art.

Figure 4:
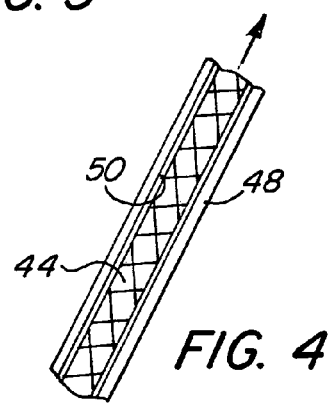
FIG. 4 is an enlarged, fragmentary sectional view, taken along line 4-4 in FIG. 1 and showing the forward guard screen assembly employed in the automobile.

As seen in FIG. 3, a first guard screen 44 is mounted over the entrance end 24 of the conduit 20, and a second guard screen 46 is mounted over the exit end 28. The screens 44, 46 are sufficiently open to enable the free flow of air therethrough while, at the same time, serving to prevent the entrance of debris, stones, and other solid matter into the conduit passage 30, such as would tend to damage the components contained therewithin. As seen in FIG. 4, the front portion of the chassis 10 or body 12 of the automobile is provided with frame pieces 48 on each of two opposite sides (only one of which is shown), which define channels 50 within which the guard screen 44 is slidably engaged, for ready removal; similar structure may be provided for mounting the guard screen 46 at the exit end of the conduit 20, and it will be apparent that any other suitable means for removably mounting the guard screens may be utilized, as desired.

Operation of the system for recharging the on-board batteries will be self-evident. Air flowing through the grille 13 and guard screen 44 enters the internal passage 30 of the conduit 20, impinging sequentially upon the blades 40 of the tandem electric microturbines 36. The thrust of the moving air effects rotation of the rotors, which in turn causes electric current to be generated by the turbine. Albeit the thrust produced will of course be greatest when the vehicle is moving forwardly (i.e., in the normal driving mode), some level of power generation may occur, under windy conditions, when the vehicle is stationary (provided of course that the ends of the conduit 20 are left uncovered).

As noted above, the conduit will typically have a diameter of at least about 30 inches, although it may be larger or smaller depending primarily upon the size and character of the motor vehicle in which a particular system is integrated. It will be appreciated however that the largest conduit that can be accommodated by a vehicle will generally be preferred, for maximum energy recovery. The conduit will, in any event, desirably be fabricated from stainless steel, or from another durable material (including plastics), and it will be constructed for effectively channeling air flow without undue friction, intrusions, obstructions, or variations, such as would retard the free flow of air and produce drag, eddy currents or other turbulence, etc.

Although electric turbines (and particularly microturbines) are referred to extensively herein as the means by which the thrust of air flow is converted to electric energy, it will be appreciated that other forms of air driven generators (available presently or in the future), constructed for the passage of air therethrough, may be employed if and as preferred. Similarly, while the electric turbines illustrated employ impellers or rotors consisting of a plurality (i.e., four) vanes or blades, three blades may be preferred and, here again, the form of the rotor used may vary considerably, as will be evident to those skilled in the art. The number of current generators incorporated may also vary, although the provision of three of the tandem-mounted turbines is believed to be optimal; two or four tandem-mounted turbines may however prove more efficient in some instances.

A particularly unique feature of the recharging system of the present invention is believed to reside in the provision of an electric turbine at the exit end of the air flow conduit, disposed proximate the underside of the vehicle. It is expected that air rushing beneath the vehicle will pass at relatively high velocities, and will thereby serve to increase rotor rotation speeds, particularly in the exit-end turbine. In accordance with the Bernoulli theorem, it is believed that air rushing beneath the automobile will cause a pressure decrease in the conduit and will thereby increase the volumetric flow rate of air moving through its passage.

As indicated above, the current-generating machines employed in the system should be optimally sized so as to most efficiently recover the energy of the flowing air. In the ideal case, the recharging system will be capable of generating at least about 10 to 12 kilowatts of power in a vehicle moving at a speed of 50 to 60 miles per hour.

It is believed that the diameter of the rotor of each turbine (e.g., of the area swept by rotor blades) should be only slightly smaller than the diameter of the corresponding section of the conduit passage, so as to cause a very high proportion of the flowing air to impinge upon the rotor, without bypass. The electric generator should, as a practical matter, be capable of generating at least about 0.2 kilowatt of power when driven by air moving at a relative velocity of 12.5 meters per second. Of course, the higher the power output of a generator the more desirable it will be, but space and weight considerations represent limiting factors. Microturbines, for example, are commercially available in a substantial range of sizes and rated characteristics, and a listing thereof is provided in Appendix 1 of the book entitled *Wind Energy Basics* (Gipe, P. Chelsea Green Publishing Company, 1999), along with the names of the respective manufacturer. The most appropriate turbine listed would appear to be the Southwest Windpower, model "Air 403" machine, which is rated to generate 0.4 kilowatt of power, albeit the 3.8 foot rotor diameter may be too large for many applications.

Rechargeable batteries suitable for use in association with the system of the invention are widely known and described in the prior art. Any suitable battery means may be employed however in the practice of the present invention, and the selection thereof will be evident to those skilled in the art.

Finally, it will be appreciated that the concepts of the present invention are applicable to motor vehicles generally, including automobiles, vans, trucks, campers, etc., which may be designed to operate using electric power exclusively or in hybrid modes. The character of the underside of the vehicle will however influence the effectiveness of air, passing at ground level, to induce increased flow through the air-flow conduit; structure that is relatively uniform, continuous, and close to the ground will maximize the pressure-reduction effect. As will also be evident to those skilled in the art, many modifications can be made to the recharging system and the motor vehicles described herein without departure from the scope of the appended claims.

Thus, it can be seen that the present invention provides a novel system for efficiently converting the thrust of moving air into electric energy, for recharging on-board battery means of an electrically powered motor vehicle. The invention also provides a novel electrically powered motor vehicle in which a recharging system is integrated, and it provides a novel method for efficiently effecting recharging of the batteries of an electric vehicle. The recharging system and method can be integrated and implemented, respectively, in an electrically powered motor vehicle without substantially diminishing either its performance or its aesthetic character, and the invention provides an attractive, high-performing electrically powered motor vehicle having the battery-recharging capability described.

Having thus described the invention, what is claimed is:

1. In an electrically powered motor vehicle comprised of a chassis, a body, an electric motor operatively connected for propelling said vehicle, and on-board rechargeable battery means operatively connected to said electric motor for providing power thereto, and having a front end portion defining a compartment therewithin, and an underside spaced above the ground, the combination comprising:

an air-flow conduit of circular cross section contained in said front end portion compartment of said vehicle, said conduit having an entrance end, proximate the front of said vehicle, and an exit end proximate said underside of said vehicle, whereby air flow is conducted by said conduit from said entrance end to said exit end during forward movement of said vehicle, said conduit comprising a first portion that extends rearwardly from said front of said vehicle on a longitudinal first axis of said vehicle, and a second portion that extends continuously from said first portion downwardly toward said underside of said vehicle generally on a second axis transverse to said first axis;

a plurality of air-driven electric generators mounted in tandem and contained wholly within said first portion of said conduit and having rotor structures disposed for effective rotation, substantially on said first axis, in reaction to air passing through said first portion of said conduit from said entrance end, for generating electric current;

an additional air-driven electric generator mounted and contained wholly within said second portion of said conduit, proximate said exit end, and having rotor structure disposed for effective rotation, substantially on said second axis, in reaction to air passing through said second portion of said conduit, for generating electric current; and means operatively connecting said plurality of tandem-mounted electric generators and said additional electric generator for delivering electric current for effecting recharging of said rechargeable battery means.

2. The motor vehicle of claim 1 additionally including guard screens effectively covering said entrance end and said exit end of said conduit, said guard screens being constructed for the free passage of air therethrough and for restricting the entrance of solid matter into said entrance and exit ends of said conduit so as to thereby minimize impact damage to said electric generators and said rotor structures thereof.

3. The motor vehicle of claim 2 wherein at least one of said guard screens is removably mounted to facilitate access to the interior of said air-flow conduit and said electric generators.

4. The motor vehicle of claim 1 comprising a plurality of at least three of said electric generators mounted in tandem within said first portion of said conduit.

5. The motor vehicle of claim 1 wherein each of said electric generators is a microturbine.

6. The motor vehicle of claim 5 wherein said microturbine has a rated
power output of at least about 0.2 kilowatt at a rated relative air speed of about 12.5 meters per second.

7. The motor vehicle of claim 1 wherein said conduit is of substantially uniform diameter along its entire length.

8. The motor vehicle of claim 7 wherein said diameter is at least about 30 inches.

9. A system for recharging an on-board rechargeable battery means of an electrically powered motor vehicle, comprising the combination:

an air-flow conduit of circular cross section constructed to be contained in a compartment defined within a front end portion of an electrically powered motor vehicle, said conduit having an entrance end, for disposition proximate the front of the vehicle, and an exit end for disposition proximate the underside of the vehicle, whereby air flow can be conducted by said conduit from said entrance end to said exit end by forward movement of the vehicle, said conduit comprising a first portion that extends from said entrance end generally on a first axis, and a second portion that extends continuously from said first portion to said exit end and generally on a second axis transverse to said first axis;

a plurality of air-driven electric generators mounted in tandem and contained wholly within said first portion of said conduit and having rotor structures disposed for effective rotation, substantially on said first axis, in reaction to air passing through said first portion of said conduit from said entrance end, for generating electric current;

an additional air-driven electric generator mounted and contained wholly within said second portion of said conduit, proximate said exit end and having rotor structure disposed for effective rotation, substantially on said second axis, in reaction to air passing through said second portion of said conduit for generating electric current; and means for operatively connecting said plurality of tandem-mounted electric generators and said additional electric generator for delivering electric current for effecting recharging of the rechargeable battery means of a motor vehicle.

10. The system of claim 9 comprising a plurality of at least three of said electric generators mounted in tandem and contained wholly within said first portion of said conduit.

11. The system of claim 9 wherein each of said electric generators is a microturbine.

12. The system of claim 11 wherein said microturbine has a rated power output of at least about 0.2 kilowatt at a rated relative air speed of about 12.5 meters per second.

13. The system of claim 12 wherein said microturbine has a rated power output of 0.3 to 0.5 kilowatt at a rated relative air speed of about 12.5 meters per second.

14. The system of claim 9 wherein said conduit is of substantially uniform diameter along its entire length.

15. The system of claim 14 wherein said diameter is at least about 30 inches.

16. A method for effecting recharging of rechargeable battery means carried on-board an electrically powered motor vehicle comprised of a chassis, a body, an electric motor operatively connected for propelling the vehicle, and on-board rechargeable battery means operatively connected to the electric motor for providing power thereto, and having a front end portion defining a compartment therewithin, and an underside spaced above the ground, comprising the steps:

providing an air-flow conduit of circular cross section contained in the compartment defined within the front end portion of the vehicle, the conduit having an entrance end, proximate the front of the vehicle, and an exit end proximate the underside of the vehicle, whereby air flow is conducted by the conduit from the entrance end to the exit end during forward movement of the vehicle, the conduit comprising a first portion that extends rearwardly from the front of the vehicle on a longitudinal first axis of the vehicle, and a second portion that extends continuously from said first portion generally downwardly toward the underside of the vehicle on a second axis transverse to the first axis;

providing a plurality of air-driven electric generators mounted in tandem and contained wholly within the first portion of the conduit and having rotor structures disposed for effective rotation, substantially on the first axis, in reaction to air passing through the first portion of the conduit from the entrance end, for generating electric current;

providing an additional air-driven electric generator mounted and contained wholly within the second portion of the conduit, proximate the exit end, and having rotor structure disposed for effective rotation, substantially on the second axis, in reaction to air passing through the second portion of the conduit, for generating electric current;

providing means for operatively connecting the plurality of tandem mounted electric generators and the additional electric generator for delivering electric current for effecting recharging of the rechargeable battery means; and propelling the motor vehicle forwardly so as to cause air to pass through the conduit from the entrance end toward the exit end thereof, and so as to cause air to pass along the underside of the motor vehicle and thereby promote air flow through the conduit toward the exit end, whereby the rotor structures of the plurality of electric generators and the additional electric generator are caused to rotate so as to generate electric current and to thereby effect recharging of the rechargeable battery means through the means for operatively connecting.

\* \* \* \* \*